United States Patent [19]

Garratt et al.

[11] 3,821,098

[45] June 28, 1974

[54] PROCESS FOR THE CURING OF HYDANTOIN CONTAINING ACRYLIC ACID ESTER DERIVATIVES WITH IONISING RAYS

[75] Inventors: Peter Garth Garratt, Wallisellenzh; Juergen Habermeier, Pfeffingenbl; Daniel Porret, Binningen; Paul Zuppinger, Arlesheim, all of Switzerland

[73] Assignee: Ciba-Geigy Corporation, Ardsley, N.Y.

[22] Filed: Apr. 5, 1972

[21] Appl. No.: 241,387

[30] Foreign Application Priority Data
Aug. 17, 1971 Switzerland.................... 12079/71

[52] U.S. Cl...... 204/159.22, 117/93.31, 117/132 R, 117/138.8 E, 117/138.8 UA, 204/159.16, 204/159.23, 204/159.24, 260/41 B, 260/47 UA, 260/85.5 B, 260/86.1 N, 260/86.1 E, 260/86.7, 260/88.3 R, 260/248 NS, 260/257, 260/260, 260/307.7, 260/309.5

[51] Int. Cl. ............... C08d 1/00, C08f 1/16
[58] Field of Search............... 204/159.22, 159.16; 260/309.5, 309.7

[56] References Cited
UNITED STATES PATENTS

| | | | |
|---|---|---|---|
| 3,369,010 | 2/1968 | Kelley | 260/309.5 |
| 3,374,242 | 3/1968 | Kelley | 260/309.5 |
| 3,455,801 | 7/1969 | D'Alelio | 204/159.22 |
| 3,455,802 | 7/1969 | D'Alelio | 204/159.22 |
| 3,632,861 | 1/1972 | Hargis | 260/837 R |
| 3,683,045 | 8/1972 | Baldwin | 260/837 R |

*Primary Examiner*—Murray Tillman
*Assistant Examiner*—Richard B. Turer

[57] ABSTRACT

Coatings with commercially valuable surface properties are obtained by application of certain polyacrylates, produced by esterification of oxalkylated N,N-heterocycles with acrylic acid and/or methacrylic acid, on to base materials, the said polyacrylates being applied in the form of thin layers which are cured with ionising rays.

16 Claims, No Drawings

PROCESS FOR THE CURING OF HYDANTOIN CONTAINING ACRYLIC ACID ESTER DERIVATIVES WITH IONISING RAYS

Methods are known by which the cross-linking of synthetic resin polymers is effected by the action of ionising rays, e.g., Roentgen rays, gamma rays, beta particles, or beams of highly accelerated electrons. In most commercial applications of these irradiation methods, electrons having an energy of between 50 and 4,000 KeV were used.

In the German Offenlegungsschrift No. 2,033,769 there is described, moreover, the application of ionising radiation for the curing of synthetic resin coatings consisting of bis-(2-acryloxyethyl)-hexahydrophthalate and/or polymeric derivatives thereof.

These known coatings obtained by means of radiation curing do have, in general, good mechanical properties, but for many technical applications they also have some disadvantages, such as, e.g., a low resistance to alkalies.

Surprisingly, it has now been found that coatings having improved resistance to alkalies are obtained if, instead of the known synthetic resin coatings from the compounds described in the German Offenlegungsschrift No. 2,033,769, synthetic resin coatings are applied which are formed from polyacrylates obtained by esterification of hydroxyalkyl-substituted N-heterocycles with acrylic or methacrylic acid, dissolved or, optionally, in admixture with reactive monomers.

The present invention relates therefore to a process for the curing of acrylic acid ester derivatives, particularly in the form of thin layers or coatings, with ionising rays, the said process comprising the irradiation of polyacrylates of the general formula:

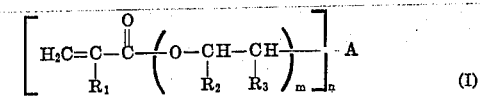
(I)

wherein $R_1$ and $R_3$ each independently represent a hydrogen atom or the methyl group, $R_2$ stands for a hydrogen atom, an alkyl group, an alkyl group interrupted by oxygen atoms, or a phenyl group; or wherein $R_2$ and $R_3$ together represent the trimethylene or tetramethylene radical, m stands for a whole number from 1 to 30, preferably from 1 to 4, n denotes the number 2 or 3, and A represents an organic radical containing at least once the grouping:

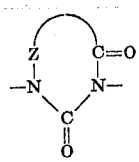

wherein Z represents a bivalent radical which is necessary for the completion of a five- or six-membered, unsubstituted or substituted, heterocyclic ring.

The radical Z in the N-heterocyclic grouping of formula I can be, e.g. a radical of the formulae:

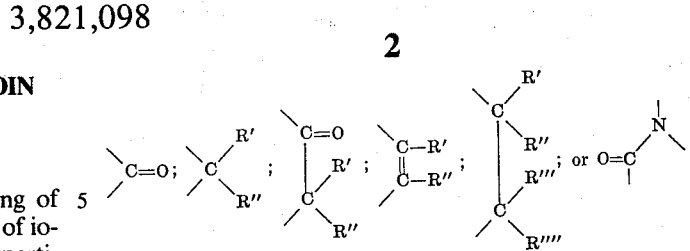

wherein R', R'', R''' and R'''' can each independently represent a hydrogen atom or an alkyl radical, preferably a lower alkyl radical having 1–4 carbon atoms, an alkenyl radical, preferably a lower alkylene radical having 1–4 carbon atoms, a cycloalkyl radical, or an unsubstituted or substituted phenyl radical.

The acrylic acid polyesters of formula I can be produced by a process in which dihydroxy compounds of the general formula:

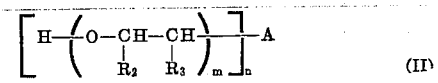
(II)

wherein $R_2$, $R_3$, m, n and A have the same meanings as defined under formula I, are esterified, in a manner known per se, or transesterified, in a manner known per se, with acrylic acid ester and/or methacrylic acid ester.

In the direct esterification of the dihydroxy compounds of formula II with acrylic acid and/or methacrylic acid the reactants are preferably condensed in approximately stoichiometric amounts, with the use of an inert azeotropising agent. These reactions are, as a rule, catalysed with acid. In the subsequent processing, the reaction solutions are washed until acid-free, concentrated by evaporation, provided with stabilizers, and then dried in vacuo to constant weight.

In the transesterification of the dihydroxy compounds of formula II with acrylic acid esters and/or methacrylic acid esters, acrylic acid esters or methacrylic acid esters of lower aliphatic alcohols are preferably used, and preferably in a stoichiometric excess. The transesterification reactions are catalysed with acids. The lower aliphatic alcohol formed during this reaction is continuously distilled off from the mixture. The excess monoacrylic acid ester or monomethacrylic acid ester is likewise removed from the reaction mixture by distillation. The crude product is then dissolved in an inert organic solvent, e.g., benzene, and the solution processed in the same way as the reaction solutions obtained by esterification.

The dihydroxy compounds of formula II are known compounds and can be produced by addition to the NH-groups of N-heterocyclic compounds containing at least once the grouping:

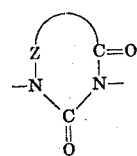

wherein Z represents a bivalent radical which is necessary for the completion of a five- or six-membered, unsubstituted or substituted, heterocyclic ring, of alkene oxides of the formula:

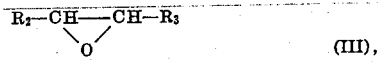
(III), wherein $R_2$ and $R_3$ have the same meanings as in formula I, in the presence of a suitable catalyst. The following may be mentioned as suitable representative alkene oxides: ethene oxide, propene oxide, n-butene oxide, 1,2-cyclopentene oxide or 1,2-cyclohexene oxide, styrene oxide, and glycidyl ethers such as butyl-, amyl-, octyl- or dodecenylglycidyl ethers.

The dihydroxy compounds of formula II used for the production of the diacrylic acid esters of formula I are, in particular, mononuclear and binuclear N-heterocyclic dihydroxy compounds.

The mononuclear dihydroxy compounds of formula II correspond to the general formula:

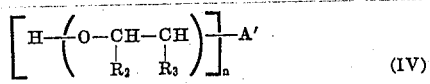
(IV)

wherein $R_2$, $R_3$, $m$ and $n$ have the same meanings as in formula I, and A' represents an organic radical containing once the grouping:

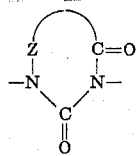

wherein Z represents a bivalent radical which is necessary for the completion of a five- or six-membered, unsubstituted or substituted, heterocyclic ring.

A preferred subclass of mononuclear N-heterocyclic dihydroxy compounds of formula IV corresponds to the formula:

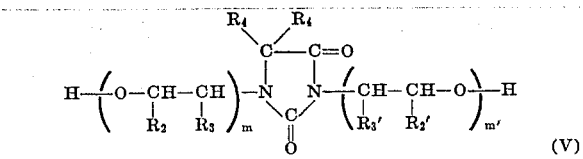
(V)

wherein $R_2$ and $R_2'$ each independently represent a hydrogen atom, an alkyl group, an alkyl group interrupted by oxygen atoms, or a phenyl group, $R_3$ and $R_3'$ each independently represent a hydrogen atom or the methyl group; or wherein $R_2$ and $R_3$ or $R_2'$ and $R_3'$ together represent the trimethylene or tetramethylene radical, $m$ and $m'$ each stand for a whole number from 1 to 30, preferably 1 to 4, and wherein $R_4$ and $R_5$ each represent a hydrogen atom, or a lower alkyl radical having 1 to 4 carbon atoms, or wherein $R_3$ and $R_4$ together form a tetramethylene or pentamethylene radical.

Representative of this class of compounds are, e.g.: 1,3-di-($\beta$-hydroxyethyl)-5,5-dimethylhydantoin, 1,3-di-($\beta$-hydroxy-n-propyl)-5,5-dimethylhydantoin, 1,3-di-($\beta$-hydroxyethoxyethoxyethyl)-5,5-dimethylhydantoin, 1,3-di-($\beta$-hydroxy-n-propyl)-5-isopropylhydantoin, 1,3-di-($\beta$-hydroxy-n-propyl)-5,5-diethylhydantoin, 1,3-di-($\beta$-hydroxy-n-propyl)-5-ethyl-5-methylhydantoin, 1,3-di-($\beta$-hydroxy-n-butyl)-5,5-dimethylhydantoin, 1,3-di-($\beta$-hydroxy-n-butyl)-5,5-dimethylhydantoin, 1,3-di-($\beta$-hydroxy-$\gamma$-n-butoxy-n-propyl)-5,5-dimethylhydantoin, 1,3-di-($\beta$-hydroxycyclohexyl)-5,5-dimethylhydantoin, 1,3-di-($\beta$-hydroxy-$\beta$-phenylethyl)-5,5-dimethylhydantoin, 1,3-di-($\beta$-hydroxy-$\beta$-phenylethoxy)-$\beta$-phenylethoxy-$\beta$-phenylethyl)-5,5-dimethylhydantoin and 1,3-di-($\beta$-hydroxy-$\beta$-phenylethyl)-5-isopropylhydantoin.

A further subclass of mononuclear N-heterocyclic dihydroxy compounds according to formula IV corresponds to the formula:

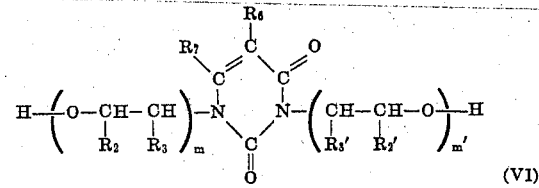
(VI)

wherein $R_2$, $R_2'$, $R_3$, $R_3'$, $m$ and $m'$ have the same meanings as in formula V, and wherein $R_6$ and $R_7$ each independently represent a hydrogen atom, or a lower alkyl radical having 1 to 4 carbon atoms. Representative of this class are, e.g.,: 1,3-di-($\beta$-hydroxy-n-propyl)-5-methyluracil, 1,3-($\beta$-hydroxy-n-butyl)-uracil and 1,3-di-($\beta$-hydroxy-$\beta$-phenylethyl)-6-methyluracil.

A further preferred subclass of mononuclear N-heterocyclic dihydroxy compounds of formula IV corresponds to the general formula:

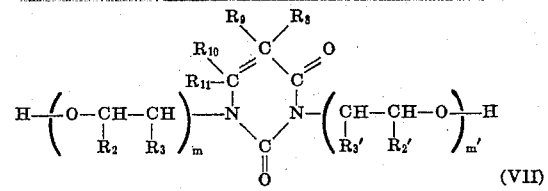
(VII)

wherein $R_2$, $R_2'$, $R_3'$, $m$ and $m'$ have the same meanings as in formula V, and wherein $R_8$ and $R_9$ each represent a hydrogen atom, or identical or different alkyl radicals, preferably alkyl radicals having 1 to 4 carbon atoms, and $R_{10}$ and $R_{11}$ each independently represent a hydrogen atom, or a preferably lower alkyl radical having 1 to 4 carbon atoms.

Representative compounds of this class are, e.g.,: 1,-3-di-($\beta$-hydroxyethyl)-5,5-dimethyl-6-isopropyl-5,6-dihydrouracil, 1,3-di-($\beta$-hydroxy-n-propyl)-5,5-dimethyl-6-isopropyl-5,6-dihydrouracil, 1,3-di-($\beta$-hydroxycyclohexyl)-5,5-dimethyl-5,6-dihydrouracil and 1,3-di-($\beta$-hydroxy-$\beta$-phenylethyl)-5,5-dimethyl-6-isopropyl-5,6-dihydrouracil.

A further preferred subclass of mononuclear N-heterocyclic dihydroxy compounds of formula IV corresponds to the general formula:

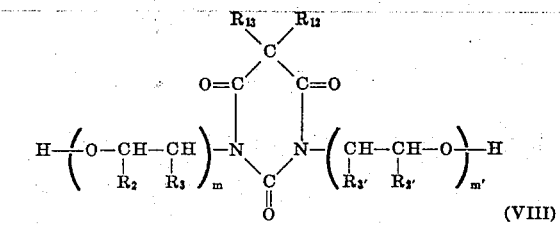
(VIII)

wherein $R_2$, $R_2'$, $R_3$, $R_3'$, $m$ and $m'$ have the same meanings as in formula V, and wherein $R_{12}$ and $R_{13}$ each independently represent a hydrogen atom, an alkyl radical, an alkenyl radical, a cycloalkyl or cycloalkenyl radical, or an unsubstituted or substituted phenyl radical. The following may be mentioned as representative compounds of this class:
1,3-di-(β-hydroxyethyl)-5-phenyl-5-ethylbarbituric acid, 1,3-di-(β-hydroxy-n-propyl)5,5-diethylbarbituric acid, 1,3-di-(β-hydrocyclohexyl)-5,5-dimethylbarbituric acid and 1,3-di-(β-hydroxy-β-phenylethyl)-5-ethyl-5-phenylbarbituric acid.

A further preferred subclass of mononuclear N-heterocyclic trihydroxy compounds of formula IV corresponds to the general formula:

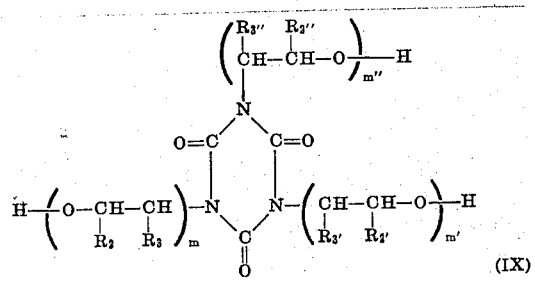

wherein $R_2$, $R_2'$ and $R_2''$ each independently stand for a hydrogen atom, an alkyl group, an alkyl group interrupted by oxygen atoms, or a phenyl group, $R_3$, $R_3'$ and $R_3''$ each independently represent a hydrogen atom, or the methyl group, or wherein $R_2$ and $R_3$, $R_2'$ and $R_3'$ or $R_2''$ and $R_3''$ together represent the trimethylene or tetramethylene radical, and $m$, $m'$ and $m''$ each stand for a whole number from 1 to 30, preferably from 1 to 4.

Representative compounds of this class are, e.g.,: tris-(β-hydroxyethyl)-isocyanurate, tris-(β-hydroxy-n-propyl)-isocyanurate, tris-(β-hydroxy-n-butyl)-isocyanurate, tris-(β-hydroxycyclohexyl)-isocyanurate and tris-(β-hydroxy-β-phenylethyl)-isocyanurate.

Forming a further applicable subclass of mononuclear N-heterocyclic dihydroxy compounds are the corresponding dihydroxy compounds of parabanic acid.

The binuclear dihydroxy compounds according to formula II which are used for the production of the diacrylic acid esters of formula I correspond to the general formula:

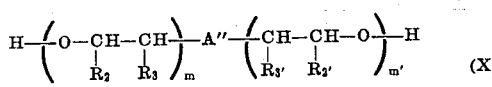

wherein $R_2$, $R_2'$, $R_3$, $R_3'$, $m$ and $m'$ have the same meanings as in formula V, and $A''$ represents an organic radical of the formula:

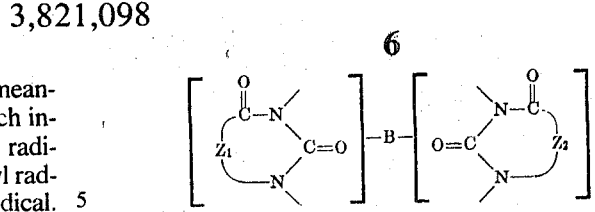

wherein $Z_1$ and $Z_2$ each independently represent a bivalent radical which is necessary for the completion of a five- or six-membered, unsubstituted or substituted, heterocyclic ring, and B stands for a bivalent aliphatic, cycloaliphatic or araliphatic radical, preferably for an alkylene radical, or for an alkylene radical interrupted by oxygen atoms.

A preferred subclass of bivalent dihydroxy compounds of formula X corresponds to the general formula:

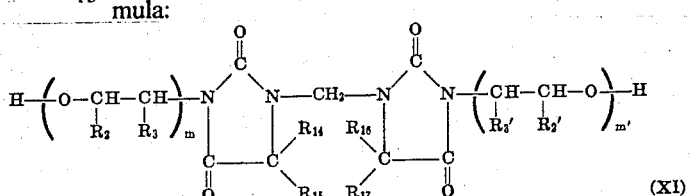

wherein $R_2$, $R_2'$, $R_3$, $R_3'$ $m$ and $m'$ have the same meanings as in formula V, and wherein $R_{14}$, $R_{15}$, $R_{16}$ and $R_{17}$ each represent a hydrogen atom or a lower alkyl radical having 1 to 4 hydrocarbon atoms, or wherein $R_3$ and $R_4$ or $R_5$ and $R_6$ together form a tetramethylene or pentamethylene radical. Representative compounds of this class are, e.g.,:
1,1'-methylene-bis-[3-(β-hydroxyethyl)-5,5-dimethylhydantoin], 1,1'-methylene-bis-[3-(β-hydroxyethoxyethoxyethyl)-5,5-dimethylhydantoin], 1,1'-methylenebis-[3-(β-hydroxy-n-propyl)-5,5-dimethylhydantoin], 1,1'-methylene-bis-[3-(β-hydroxy-n-propyl)-5-isopropylhydantoin], 1,1'-methylene-bis-[3-(β-hydroxy-n-butyl)-5,5-dimethylhydantoin], 1,1'-methylene-bis-[3-(β-hydroxy-β-phenylethyl)-5,5-dimethylhydantoin], 1,1'-methylene-bis-[3-(β-hydroxy-β-phenylethyl)-5,5-isopropylhydantoin] and 1,1'-methylene-bis-[3-(β-hydroxy-β-cyclohexyl)-5,5-dimethylhydantoin].

A further preferred subclass of bivalent dihydroxy compounds of formula IX corresponds to the general formula:

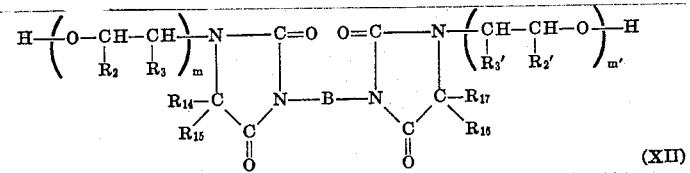

wherein $R_2$, $R_2'$, $R_3$, $R_3'$, $R_{14}$, $R_{15}$, $R_{16}$, $R_{17}$, $m$ and $m'$ have the same meanings as in formula X, and B stands for a bivalent aliphatic, cycloaliphatic, araliphatic radical, or for an alkylene radical interrupted by oxygen atoms. Representative compounds of this class are, e.g.,: 1,4-bis-[1'-(β-hydroxyethyl)-5',5'-dimethylhydantoinyl-3']-butane, 1,6-bis-[1'-(β-hydroxyethyl)-5',5'-dimethylhydantoinyl-3']-hexane, 1,6-bis-[1'-(β-hydroxy-n-propyl)-5',5'-dimethylhydantoinyl-3']-hexane, 1,6-bis-[1'-(β-hydroxy-n-butyl)-5',5'-dimethylhydantoinyl-3']-hexane, 2,2'-bis-[1-(β-hydroxy-n-butyl)-5,5-dimethylhydantoinyl-3]-diethyl ether, 2,2'-bis-[1-(β-hydroxy-β-phenylethyl)-5,5-dimethylhydantoinyl-3]-diethyl ether and 1,12-bis-[1'-(β-hydroxy-β-phenylethyl)-5,5-dimethylhydantoinyl-3']-dodecane.

A further suitable subclass of binuclear dihydroxy compounds corresponds to the following formula:

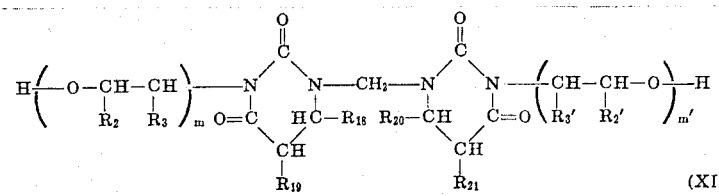

(XIII)

wherein $R_2$, $R_2'$, $R_3$, $R_3'$, $m$ and $m'$ have the same meanings as in formula IX, and $R_{18}$, $R_{19}$, $R_{20}$ and $R_{21}$ each independently represent a hydrogen atom, or a lower alkyl radical having 1 to 4 hydrocarbon atoms. Representative compounds of this class are, e.g.,:
1,1'-methylene-bis-[3-($\beta$-hydroxyethyl)-5,5-dimethyl-5,6-dihydrouracil] and 1,1'-methylene-bis-[3-($\beta$-hydroxy-n-propyl)-5,5-dimethyl-5,6-dihydrouracil].

Forming a further class of suitable polyhydroxy compounds are such compounds which contain the N-heterocyclic ring more than twice in the molecular.

Suitable monomers which can be added to the polyacrylates of formula I are, in particular, compounds of the acrylic acid series, such as esters from acrylic acid or methacrylic acid, and alcohols or phenols, e.g., methylacrylate, ethylacrylate, butylacrylate, dodecyacrylate, methylmethacrylate; acrylonitrile, methacrylonitrile, ethylene glycol dimethylacrylate. It is moreover possible to use other reactive olefinic unsaturated monomers, such as, e.g., styrene, divinylbenzene, vinyl esters such as vinyl acetate, allyl compounds such as diallylphthalate, and others.

The polyacrylates specially suitable for the production of coatings may additionally contain flexibilising-agents, fillers, and preferably pigments, e.g., titanium dioxide.

The polyacrylate mixtures exhibit good adhesiveness on the surface of the base material; and coatings can therefore be produced without difficulty on metals, wood, plastics, glass, paper, leather, etc.

The curing of the polyacrylate mixture can be carried out with any form of ionising radiation, preferably with a high-energy electromagnetic radiation such as, e.g., with Roetgen or gamma radiation, as well as with accelerated electrons. In the last-mentioned case, the process is performed with a mean electron energy of 50 KeV to 4,000 KeV. If it is required to cure thin layers, such as, e.g., coatings, then a mean electron energy of 50 to 600 KeV and a curing dose of 0.5 to 5.0 Megarad, preferably of 1.0 to 3.0 Megarad, are applied.

The polyacrylate mixture can be advantageously subjected, before, during or after curing, additionally to a heat treatment, which leads in some cases to a promotion of cross-linking.

Curing is advantageously performed in the absence of oxygen. In order to effect this, a protective gas atmosphere, e.g., nitrogen, is used.

It is advantageous in some cases to add to the polyacrylate mixture small amounts of a polymerisation catalyst forming free radicals, such as, e.g., peroxides, azo compounds, or persulphates.

If not otherwise stated in the following examples, the term "parts" denotes parts by weight, and percentages are expressed in per cent by weight; the temperatures are given in degrees Centigrade.

Production of the polyacrylates

Polyacrylate A

A mixture of 432.2 g of 1,3-bis-($\beta$-hydroxyethyl)-5,5-dimethylhydantoin (2 moles), 361.2 g of freshly distilled methacrylic acid (4.2 moles), 0.1 g of phenothiazine, 1,200 ml of benzene and 10 ml of concentrated sulphuric acid is heated, with vigorous stirring and a bath temperature of 130° C, until an internal temperature of 78° C is obtained. An azeotropic circulation distillation is thereby initiated, in consequence of which, as the benzene separated by cooling flows back, the water present in the reaction mixture is continuously removed from the mixture and separated. The amount of water separated after 5 hours is 48 ml, and after 18 hours 70 ml (97.2 percent of theory).

The reaction mixture is then cooled to room temperature, and the benzene solution washed first with a 20 percent aqueous ammonia solution containing 5 percent of ammonium sulphate, and then with a 5 percent aqueous ammonium sulphate solution. An amount of 3.5 g of hydroquinone is added to the organic phase (0.5 per cent by weight relative to the amount theoretically to be expected at the final point), and the whole concentrated in a rotary evaporator at 50°–60° C under a water-jet vacuum; the residue is subsequently dried at 55° C under 0.2 Torr to constant weight.

An amount of 621 g (88.2 percent of theory) of a clear, pale yellow, low-viscous resin is obtained.

The titrimetrically determined content of methacrylate groups corresponds to 100 percent of the theoretical content. These content measurements are carried out by addition of dodecylmercaptan, and iodometric reverse-titration of the mercaptan excess. The unreacted methacrylic acid molecules are not affected in the process, and this method is therefore also applicable for verification of the course of the reaction. This titration procedure is described by K. Muller and "Zeitschrift for analytische Chemie" 18, 135-137 (1961), and by D. W. Beesing et al. in "Analytical Chemistry" 21, 1073 (1949).

The infra-red spectrum (capillary absorption) shows, amongst other things, by the absorptions at 1,637 cm$^{-1}$, 1,718 cm$^{-1}$ and 1,776 cm$^{-1}$ that, besides the hydantoin and ester-carbonyl frequencies, the C=C—absorption is present.

The elementary analysis shows: found: 57.9 percent C, 6.9 percent H and 7.8 percent N (calculated: 57.9 percent C, 6.9 percent H, 7.9 percent N).

The proton-magnetic resonance spectrum (60 Mc-HNMR, taken in deuterochloroform (CDCl$_3$), against tetramethylsilane (TMS) as internal standard) varifies, amongst other things, by the following signals that the below structure is in agreement:

6 protons; $\delta = 1.38$ : singlet:

6 protons; $\delta = 1.92$ : singlet: $\underline{H}_3C$-C=C-
4 protons; $\delta = 3.45$–3.78 : multiplet 2x-C$\underline{H}_2$-O-CO
4 protons; $\delta = 4.22$–4.11 : triplet: 2x-C$\underline{H}_2$-N-CO-
4 protons; $\delta = 5.50$–5.60 ; 6.01–6.11 :

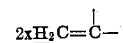

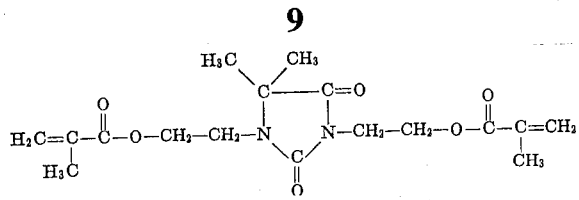

Polyacrylate B

A mixture of 216.1 g of 1,3-bis-(β'-hydroxyethyl)-5,5-dimethylhydantoin (1 mole), 400 g of methacrylic acid methyl ester (4.0 moles), 0.08 g of phenothiazine and 5 ml of concentrated sulphuric acid is stirred, at 140° C heating bath temperature, in a glass apparatus provided with stirrer, internal thermometer, and 40 cm packed column with ditillation head. During the course of the reaction, the reaction temperature rises from 92° to 96° C. The reflux conditions at the distillation head are adjusted so that initially practically only methanol is distilled off, which takes about 5 hours. The excess methylmethacrylate is then distilled off within 3 hours.

The reaction mixture is diluted with 200 ml of benzene and washing then performed as described for the preparation of Polyacrylate A. An addition is made to the benzene phase of 1.5 g of hydroquinone and a trace of sodium nitrite, and the whole concentrated in a rotary evaporator at 50° C under a water-jet vacuum; drying is carried out at 50°–55° C under 0.15 Torr. A clear yellow resin (269 g, corresponding to 77 percent of theory) is obtained, of which the acrylate content, determined in the manner described for the production of polyacrylate, corresponds to 100 percent of the theoretical content.

The obtained product is identical to Polyacrylate A.

Polyacrylate C

In a manner corresponding to that in which Polyacrylate B is produced, an amount of 244 g of 1,3-bis-(β-hydroxy-n-propyl)-5,5-dimethylhydantoin (1 mole) is esterified with 457 g of methylmethacrylate (4 moles), a process entailing the use of 0.08 g of phenothiazine and 5 ml of concentrated sulphuric acid. The carrying out of the reaction and the processing of the product according to the procedure for the production of Polyacrylate B yield 205 g of a brown, medium-viscous liquid (54 percent of theory) of which the methacrylate content is 70 percent of the theoretical content. The substance corresponds essentially to the following formula:

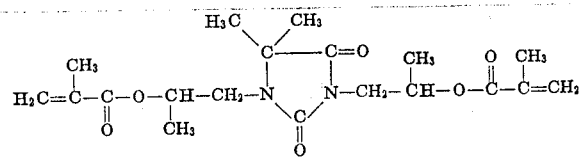

Polyacrylate D

A mixture of 639 g of tris-(β-hydroxyethyl)-isocyanurate (3.0 moles), 681,0 g of acrylic acid (9.45 moles), 0.36 g of phenothiazine, 60 g of an acid ion exchanger of activation I, 0.1 g of triphenylphosphite, 2,200 ml of benzene and 5 ml of concentrated sulphuric acid is subjected to an azeotropic circulation distillation with the separation of water. As vigorous stirring is maintained, the temperature of the heating bath is 150° C, and the temperature of the reaction mixture 85° C. An amount of 171 ml of water has been separated after about 40 hours. The reaction mixture is then cooled to room temperature, filtered, and concentrated to about 1 litre. This solution is extracted with 200 ml of a 5 percent solution of ammonium sulphate in 5 percent ammonia. After separation of the aqueous phase, complete concentration is carried out in a rotary evaporator at 55° C under a water-jet vacuum, and then drying under 0.2 Torr to obtain constant weight.

An amount of 1,022 g (85.4 percent of theory) of a viscous light-yellow resin is obtained having a content of polymerisable double bonds of 5.9 equivalents/kg (78.5 percent of theory). The compound gradually changes into a crystal sludge and then into a solid crystalline mass. The microanalysis gives the following values:

| Found | Calculated |
|---|---|
| 5.10% H | 5.00% H |
| 9.60% N | 9.93% N |

For purification, the product can be recrystallised, e.g., from tetrahydrofuran. The NMR-spectrum (60 Mc HNMR in CDCl₃) of the purified substance agrees with the following structure:

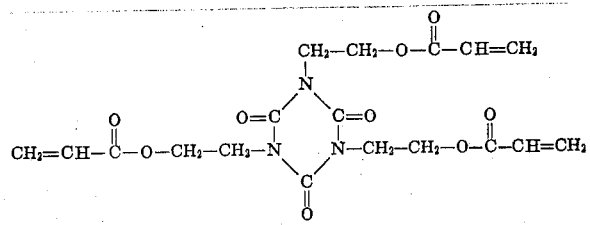

Polyacrylate E

With the same procedure as that used for the production of Polyacrylate A, the following mixture is caused to react in a glass reaction flask:
- 366.5 g of 1,3-bis-(β-hydroxy-n-propyl)-5,5-dimethylhydantoin (1.5 moles),
- 433.0 g of acrylic acid (3 moles),
- 900.0 ml of toluene,
- 0.3 g of phenothiazine,
- 1.5 g of triphenylphosphite.

The catalyst employed consists of 25 ml of 50 percent sulphuric acid, which is added gradually dropwise.

The above mixture is stirred at 168° C bath temperature; the internal temperature rises in the course of the reaction from 109° to 113° C. The amount of water theoretically to be expected has been separated after about 5 hours. The reaction mixture is then cooled to 25° C and then processed. For this purpose, the solution, after being filtered until clear, is washed twice with 500 ml of water containing 10 percent of ammonia and 5 percent of ammonium sulphate. After separation of the aqueous phase, the following inhibitor system of the organic phase is added: 1.7 g of hydroquinone, 0.006 g of brenzcatechin, 0.1 g of 8 percent copper naphthenate and 0.14 g of sodium nitrite in 0.4 ml of water. The organic phase is subsequently concentrated at 55°C in the rotary evaporator under a water-jet vacuum, and the residue then dried within 2 hours at 55°C under 0.3 Torr to constant weight. An amount of 468.3 g (88.6% of theory) of a pale yellow, low viscous liquid is obtained, which contains 5.21 acrylate equivalents/kg, which corresponds to a content of acrylate double bonds of 91.8% of theory. The substance corresponds essentially to the following structure:

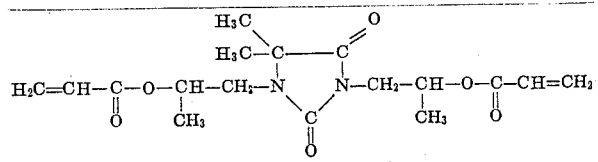

Polyacrylate F

An amount of 216.1 g of 1,3-bis-($\beta'$-hydroxyethyl)-5,5-dimethylhydantoin (1 mole) and 151.2 g of acrylic acid are esterified with the aid of 5 ml of concentrated sulphuric acid in 600 ml of benzene with the addition of 0.08 g of phenothiazine, in the manner described in detail for the preparation of Polyacrylate A. Processing and stabilisation are carried out likewise with the procedure as used for the production of Polyacrylate A An amount of 290 g of a pale yellow liquid (89.4 percent of theory) is obtained, the purity of which, relative to the content of acrylate groups, is 83 percent of theory.

The proton-magnetic resonance spectrum (60 Mc-HNMR, in CDCl$_3$ against TMS) shows, by the presence of the following signals, that essentially the below given structure is in agreement:

$\delta = 1,42$ : singlet:

$\delta = 3,52$–$3,95$ : multiplet:    $2 \times $ —CH$_2$—O—CO
$\delta = 4,30$–$4,55$ : triplet:    $2 \times $ —CH$_2$—N—CO—
$\delta = 5,80$–$6,85$ : 2 multiplet:    $2 \times $ H$_2$C=CH—CO—

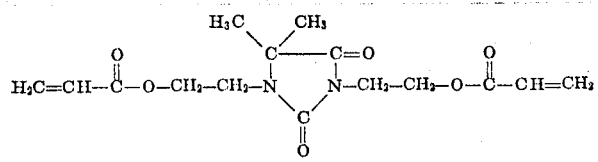

Example 1

Films 90 m$\mu$ thick of Polyacrylates A to D according to Table I, and of mixtures of these polyacrylates and polymerisable monomers according to Table 2, were applied to electrolytically pretreated iron sheets (sheet thickness = 0.3 mm). After about one minute, these films were exposed to accelerated electrons possessing a mean energy of 400 KeV, this exposure being effected by the sheets being passed lengthwise through an electron beam (radiation intensity 4 Megarad/sec.). The irradiations were carried out at room temperature. The exposure to radiation was performed in a nitrogen atmosphere (maximum oxygen concentration 0.2 percent). Immediately afterwards, the films were examined with regard to surface stickiness, and their surface hardness tested by a simple test method with a steel blade. The resistance of the synthetic resin films to chemical solvents was tested by application of a drop of toluene (and acetone); the insoluble portion was determined in an extraction apparatus according to Soxhlet by 24 hours' extraction with toluene. The following Tables 1 and 2 show the obtained results. The curing dose constitutes the minimum radiation dose necessary for the production of a non-tacky film having good surface hardness.

It was established that a high degree of cross-linking of the films can be obtained with the stated curing dose.

Table 1

Curing dose and percentage insoluble proportion of cured polyacrylates of N-heterocyclic compounds.

| Polyacrylate | C=C double bond content/kg | Curing dose (Megarad) | Insoluble proportion in % |
|---|---|---|---|
| A | 5,6 | 1,5 | 78 |
| B | 5,0 | 1,5 | 95 |
| C | 3,2 | 1,5 | 59 |
| D | 5,9 | 1,0 | 96 |
| E | 5,2 | 1,0 | 100 |
| F | 5,7 | 0,75 | 85 |

Table 2

Curing dose and percentage insoluble proportion of cured mixtures of polyacrylates of N-heterocyclic compounds and polymerisable monomers.

| Polyacrylate | Monomers | Weight ratio polyacrylate : monomers | Curing dose (Megarad) | Insoluble proportion in % |
|---|---|---|---|---|
| A | Butylacrylate | 70 : 30 | 2,5 | 68 |
|   | Methylmethacrylate | 70 : 30 | 2,5 | 82 |
|   | Styrene | 70 : 30 | 9,0 | 91 |
| B | Butylacrylate | 70 : 30 | 4,0 | 86 |
|   | Methylmethacrylate | 70 : 30 | 3,0 | 78 |
|   | Styrene | 70 : 30 | 10,0 | 81 |
| D | Butylacrylate | 70 : 30 | 1,0 | 92 |
|   | Methylmethacrylate | 70 : 30 | 1,5 | 99 |
|   | Styrene | 70 : 30 | 5,0 | 77 |
| E | Butylacrylate | 70 : 30 | 1,5 | 100 |
|   | Methylmethacrylate | 70 : 30 | 2,5 | 100 |
|   | Styrene | 70 : 30 | 15,0 | 100 |
| F | Butylacrylate | 70 : 30 | 1,0 | 92 |
|   | Methylmethacrylate | 70 : 30 | 2,0 | 72 |
|   | Styrene | 70 : 30 | 10,0 | 91 |

Example 2

Films 60 m$\mu$ thick of a solution prepared from 70 parts of Polyacrylate B and 30 parts of butylacrylate were applied to steel sheets ("Granodine 1107," cold-rolled steel, St 1405, sheet thickness 0.75 mm) pretreated with iron phosphate. These steel sheets were exposed to radiation, as described in Example 1. The films were subsequently examined, without delay, with respect to their surface tackiness and their surface hardness in accordance with the method described in Example 1. It was established that the films can be cured with a radiation does of 3.0 Megarad.

The films were examined again after 24 hours. The dry layer thickness was determined according to VDI 2451 (non-destructively). The thickness of the film was 40 mμ. The scratching hardness of the lacquer was determined with the hardness test specimen (according to Erichsen; type 318). The films attained a hardness value of 200 p (according to the Erichsen scale). The pendulum hardness of the films was determined according to DIN 53,157 (Konig). The films attained a pendulum hardness of 205 seconds. The pencil hardness was F-H (according to SNV 37,113).

Example 3

Films 60 mμ thick of a mixture of 70 parts of polyacrylate D and 30 parts of butylacrylate were applied to ABS (acrylonitrile-butadiene-styrene)-plastic sheets, and exposed to radiation in the manner described in Example 1. The necessary curing dose was 2.5 Megarad.

The films were examined after a few days. The surface hardness was determined according to SNV 37,113 (pencil hardness) and DIN 53,153 (Buchholz). The films attained a pencil-hardness of H-2H, and a penetration resistance according to Buchholz of 120 degrees.

The scratching hardness (according to Erichsen hardness-test specimen Type 318) was 350 p. A cross-hatch adhesion O (according to DIN 53,151 with subsequent Tesa film separation) was measured. Furthermore, the films attained a pendulum-hardness (according to DIN 53,157) of 150 seconds.

Compared with the untreated ABS-plastic sheets, the lacquer coatings are distinguished by improved resistance to abrasion and to scratching. The untreated sheets having a scratching-hardness of < 50 p (measured according to the Erichsen scale). The adhesion of the films was outstanding.

We claim:

1. Process for the curing of acrylic acid ester derivatives, particularly in the form of thin layers or coatings, with ionising rays, the said process comprising the irradiation produced by electrons with a mean energy of 50 KeV to 4,000 KeV and a curing dose of 0.5 to 15.0 megarads of compounds of formula I

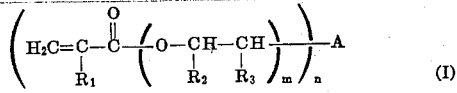 (I)

wherein $R_1$ and $R_3$ each independently represent a hydrogen atom or the methyl group, $R_2$ stands for a hydrogen atom, an alkyl group, an alkyl group interrupted by oxygen atoms, or a phenyl group; or wherein $R_2$ and $R_3$ together represent the trimethylene or tetramethylene radical, $m$ stands for a whole number from 1 to 30, preferably from 1 to 4, $n$ denotes the number 2 or 3, and A represents an organic radical containing at least once the grouping:

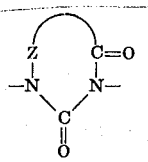

wherein Z represents a bivalent radical which is necessary for the completion of a five- or six-membered, unsubstituted or substituted, heterocyclic ring.

2. Process according to claim 1, the said process comprising the irradiation of polyacrylates of formula I in admixture with other reactive olefinic unsaturated monomers.

3. Process according to claim 1 or 2, wherein the curing of the polyacrylates is effected by means of an ionising radiation produced by electrons with a mean energy of at least 50 KeV, and at most 4 MeV.

4. Process according to claim 1 or 2, wherein the curing of the polyacrylates is effected by means of an ionising radiation produced by electrons with a mean energy of 50 to 600 KeV.

5. Process according to claim 1 or 2, wherein the curing of the polyacrylates is effected by means of an ionising radiation in the form of Roentgen or gamma rays.

6. Process according to claims 1 to 5, wherein the polyacrylates are subjected, before, during or after the action of an ionising radiation, additionally to a heat treatment.

7. Process according to claims 1 to 6, wherein the action of an ionising radiation on the polyacrylates is applied in an atmosphere low in oxygen.

8. Process according to claims 1 to 7, the said process comprising the use of polyacrylates of the formula:

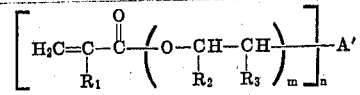

wherein $R_1$, $R_2$, $R_3$, m and n have the same meaning as in formula I of claim 1, and A' represents an organic radical containing once the grouping:

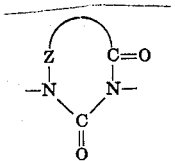

wherein Z represents a bivalent radical which is necessary for the completion of a five- or six-membered, unsubstituted or substituted, heterocyclic ring.

9. Process according to claim 8, the said process comprising the use of a diacrylate of the formula:

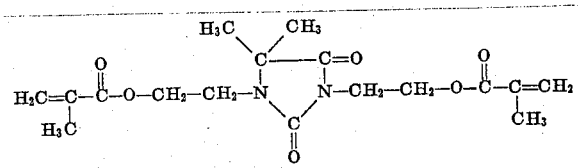

10. Process according to claim 8, the said process comprising the use of a diacrylate of the formula:

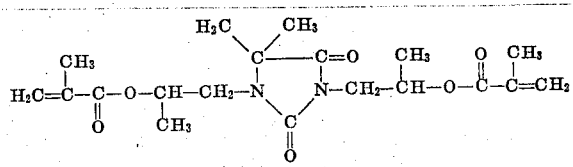

11. Process according to claim 8, the said process comprising the use of a diacrylate of the formula:

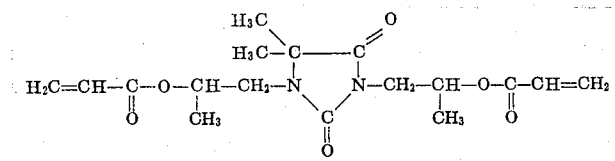

12. Process according to claim 8, the said process comprising the use of a diacrylate of the formula:

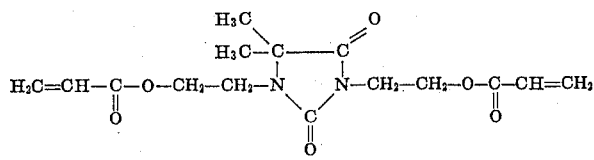

13. Process according to claim 8, the said process comprising the use of a triacrylate of the formula:

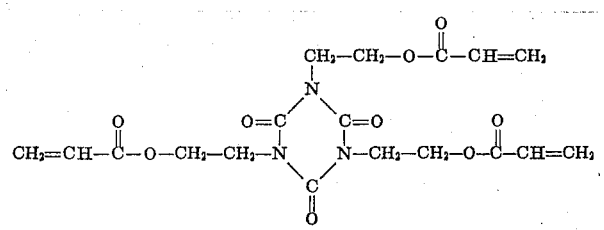

14. Process according to claims 1 to 7, the said process comprising the use of polyacrylates of the formula:

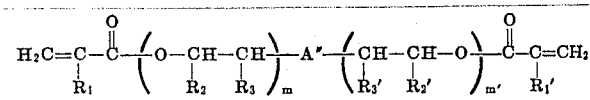

wherein $R_1$, $R_1'$, $R_3$ and $R_3'$ each independently represent a hydrogen atom or the methyl group, $R_2$ and $R_2'$ each independently represent a hydrogen atom, an alkyl group, an alkyl group interrupted by oxygen atoms, or a phenyl group; or wherein $R_2$ and $R_3$ or $R_2'$ and $R_3'$ together represent the trimethylene or tetramethylene radical, $m$ an $m'$ each stand for a whole number from 1 to 30, preferably from 1 to 4, and $A''$ represents a radical of the formula:

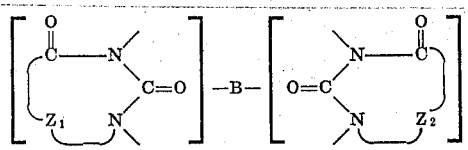

wherein $Z_1$ and $Z_2$ each independently represent a bivalent radical which is necessary for the completion of a five-or six-membered, unsubstituted or substituted, heterocyclic ring, and B stands for a bivalent aliphatic, cycloaliphatic or araliphatic radical, preferably for an alkylene radical, or for an alkylene radical interrupted by oxygen atoms.

15. Process according to claims 2 to 14, wherein the curable polyacrylate mixture contains as monomers methacrylate, butylacrylate, methylmethacrylate, acrylonitrile, styrene, ethylene glycol dimethacrylate, divinyl benzene, vinyl acetate or diallyl-o-phthalate.

16. Process according to claims 1 to 15, wherein the curable synthetic resin mixture additionally contains fillers, pigments and/or flexibilisng agents.

* * * * *